United States Patent Office 3,652,762
Patented Mar. 28, 1972

3,652,762
PHARMACEUTICAL COMPOSITIONS AND METHODS EMPLOYING SUBSTITUTED DERIVATIVES OF 2-ANILINOPHENYLACETIC ACIDS AND ESTERS
Alfred Sallmann, Bottmingen, and Rudolf Pfister, Basel, Switzerland, assignors to Ciba-Geigy Corporation, Ardsley, N.Y.
No Drawing. Division of application Ser. No. 861,571, Sept. 29, 1969, which is a continuation-in-part of applications Ser. No. 782,206, Dec. 9, 1968, Ser. No. 782,473, Dec. 9, 1968, and Ser. No. 625,326, Mar. 23, 1967. Divided and this application Apr. 14, 1970, Ser. No. 28,507
Int. Cl. A61k 27/00
U.S. Cl. 424—60
46 Claims

ABSTRACT OF THE DISCLOSURE

Pharmaceutical compositions containing substituted 2-anilinophenylacetic acids, their esters and salts have desirable absorption patterns for protecting the skin against the irritating effect of ultraviolet light and are also anti-inflammatory agents. Typical embodiments are compositions containing 2-(2,6-dichloroanilino)phenylacetic acid, the sodium salt thereof and the methyl ester thereof.

CROSS REFERENCE

This is a divisional application of Ser. No. 861,571 filed Sept. 29, 1969, Ser. No. 861,571 being a continuation-in-part of then copending Ser. Nos. 782,206, 782,473 and 625,326 filed Dec. 9, 1968, Dec. 9, 1968 and Mar. 23, 1967 respectively, now all abandoned, Ser. No. 782,206 being a continuation-in-part of Ser. No. 625,326 now abandoned and of Ser. No. 539,826, filed Apr. 4, 1966 and now abandoned.

DETAILED DESCRIPTION

The present invention pertains to substituted 2-anilinophenylacetic acids, to salts and esters thereof, to methods of treating inflammatory conditions and of protecting skin against irritating ultraviolet light, to compositions adapted for these methods, and to novel synthetic methods for the preparation of these compounds.

In a first embodiment, the present invention pertains to 2-(2-substituted anilino)phenylacetic acids and -acetates of the formula:

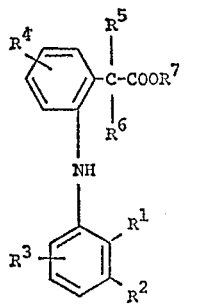

I(A)

wherein $R^1$ is (lower)alkyl, (lower)alkoxy, fluoro or chloro;
each of $R^2$ and $R^3$ is hydrogen, (lower)alkyl, chloro or fluoro;
$R^4$ is hydrogen, (lower)alkyl, (lower)alkoxy, chloro, fluoro or bromo;
$R^5$ is hydrogen or (lower)alkyl;
$R^6$ is hydrogen, (lower)alkyl or when $R^5$ is hydrogen, benzyl; and
$R^7$ is hydrogen, (lower)alkyl or benzyl.

The 2-(substituted anilino)phenylacetic acids and -acetates of this first embodiment will necessarily have a substituent in the 2-position of the anilino ring. This substituent, designated by $R^1$, is a (lower)alkyl, (lower)-alkoxy, chloro or fluoro group, preferably methyl or chloro.

In a second embodiment, the present invention pertains to 2-(3-trifluoromethylanilino)phenylacetic acids and -acetates of the formula:

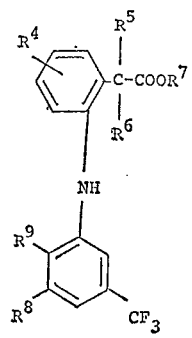

I(B)

wherein each of $R^4$, $R^5$, $R^6$ and $R^7$ is as defined above for Formula I (A);
$R^8$ is hydrogen or trifluoromethyl; and
$R^9$ is hydrogen or chloro.

In the compounds of Formula I(A) and (B) and in the present specification, the term (lower)alkyl means a straight or branched monovalent hydrocarbon chain of from 1 to 5 carbon atoms. The term (lower)alkoxy is defined as a (lower)alkyl connected through an ether oxygen link. Thus alkyl includes for example, methyl, ethyl, n-propyl, isopropyl, n-butyl, sec. butyl, and tert. butyl, preferably methyl or ethyl, while (lower)alkoxy includes for example, methoxy, ethoxy, n-propoxy, isopropoxy, n-butoxy, and isobutoxy, preferably methyl or ethyl.

The compounds of Formulas I(A) and I(B) absorb the irritating rays of ultraviolet light which are primarily responsible for sunburn, those of a wavelength of about 290 to about 300–315 millimicrons, while at the same time they do not absorb the desirable so-called "tanning" rays of over 315 millimicrons wavelength. These compounds are, therefore, especially useful as ultraviolet absorbers for cosmetic purposes, e.g., in sun-tan creams or lotions.

The compounds advantageously also possess anti-inflammatory, analgesic and antipyretic activity combined with a favorable therapeutic index. This activity can be observed in various standard pharmacological tests, as for example in the bolus alba test in rats, the UV-erythema test in guinea pigs, the cotton pellet test in rats, the phenylquinone stretch test in mice, etc. These properties render the compounds of the invention additionally suitable for the treatment of rheumatic, arthritic and other inflammatory conditions.

As an example of the anti-inflammatory activity of the compounds, the sodium salt of 2-(2,6-dichloroanilino)-phenylacetic acid demonstrates a significant inhibitory effect in bolus alba induced edema in the rat paw, described by G. Wilhelmi, Jap. Journ. Pharmac. 15, 190 (1965).

Topical sun-tan compositions according to the invention contain at least one compound of Formulas I(A) or I(B) or a pharmaceutically acceptable salt thereof with a base, in an amount which absorbs a sufficient amount of ultraviolet radiation having a wavelength in the range of from 290 to 315 millimicrons, as well as a carrier compatible with the compound or salt, the carrier being of a creamy to highly fluid consistency so as to provide an ointment, cream or oil.

When utilized primarily for their anti-inflammatory activity, the compounds of the present invention can also be administered orally, rectally or parenterally, in particular intramuscularly. The 2-(substituted anilino)phenylacetate esters falling under Formulas I(A) and I(B) are principally administered orally or rectally. Suitable pharmaceutical forms include solid and liquid unit oral dosage forms such as tablets, capsules, powders, suspensions, solutions, syrups and the like, including sustained release preparations, and fluid injectable forms such as sterile solutions and suspensions. The term dosage form as used in this specification and the claims refer to physically discrete units to be administered in single or multiple dosage to animals, each unit containing a predetermined quantity of active material in association with the required diluent, carrier or vehicle. The quantity of active material is that calculated to produce the desired therapeutic effect upon administration of one or more of such units.

Powders are prepared by comminuting the compound to a suitably fine size and mixing with a similarly comminuted diluent pharmaceutical carrier such as an edible carbohydrate material as for example, starch. Sweetening, flavoring, preservative, dispersing and coloring agents can also be present.

Capsules are made by preparing a powder mixture as described above and filling formed gelatin sheaths. A lubricant such as talc, magnesium stearate and calcium stearate can be added to the powder mixture as an adjuvant before the filling operation; a glidant such as colloidal silica may be added to improve flow properties; a disintegrating or solubilizing agent may be added to improve the availability of the medicament when the capsule is ingested.

Tablets are made by preparing a powder mixture, granulating or slugging, adding a lubricant and disintegrant and pressing into tablets. A powder mixture is prepared by mixing the compound, suitably comminuted, with a diluent or base such as starch, sucrose, kaolin, dicalcium phosphate and the like. The powder mixture can be granulated by wetting with a binder such as syrup, starch paste, acacia mucilage or solutions of cellulosic or polymeric materials and forcing through a screen. As an alternative to granulating, the powder mixture can be run through the tablet machine and the resulting imperfectly formed slugs broken into granules. The granules can be lubricated to prevent sticking to the tablet forming dies by means of the addition of stearic acid, a stearate salt, talc or mineral oil. The lubricated mixture is then compressed into tablets. The medicaments can also be combined with free flowing inert carriers and compressed into tablets directly without going through the granulating or slugging steps. A protective coating consisting of a sealing coat of shellac, a coating of sugar or polymeric material and a polish coating of wax can be provided. Dyestuffs can be added to these coatings to distinguish different unit dosages.

Oral fluids such as syrups and elixirs can be prepared in unit dosage form so that a given quantity, e.g., a teaspoonful, contains a predetermined amount of the compound. Syrups can be prepared by dissolving the compound in a suitably flavored aqueous sucrose solution while elixirs are prepared through the use of a non-toxic alcoholic vehicle. Suspensions can be formulated by dispersing the medicament in a non-toxic vehicle in which it is insoluble.

For parenteral administration, fluid unit dosage forms can be prepared by suspending or dissolving a measured amount of the compound in a non-toxic liquid vehicle suitable for injection such as an aqueous or oleaginous medium. Alternatively a measured amount of the compound is placed in a vial and the vial and its contents are sterilized and sealed. An accompanying vial or vehicle can be provided for mixing prior to administration.

The daily dosages, to be taken internally, of compounds of Formulas I(A) or I(B) or pharmaceutically acceptable salts thereof with a base, for the treatment of rheumatic, arthritic and other inflammatory conditions is from about 50 to about 1500 mg. for adult patients, although the amounts administered depend upon the species, age and weight of the subject matter under treatment, as well as the particular condition to be treated and the mode of administration. Dosage units such as dragees, tablets or suppositories, preferably contain from about 25 to about 300 mg. of a compound of Formulas I(A) or I(B) or a pharmaceutically acceptable salt thereof. Unit dosages for oral administration preferably contain from 1% to 90% of an active ingredient of Formula I(A) or I(B).

Pharmaceutically acceptable salts of the acids falling under Formulas I(A) or I(B) are obtained either in the courses of the production of the acids as described hereafter, or via conventional methods, such as the mixing of preferably equimolar amounts of the free acid and the base in a suitable solvent, such as water, methanol, ethanol, diethyl ether, chloroform, methylene chloride or the like. Salts, which in certain solvents have an appreciably lower solubility than the alkali salts, can also be produced from the latter by double reaction. Pharmaceutically acceptable salts of the acids falling under Formulas I(A) and I(B) are such as derived from non-toxic inorganic or organic bases. Examples of such salts are the sodium, potassium, lithium, magnesium, calcium and ammonium salts, as well as salts with ethylamine, triethylamine, 2-aminoethanol, 2,2-iminodiethanol, 2-dimethylamino-ethanol, 2-diethylaminoethanol, ethylenediamine, benzylamine, p - aminobenzoic acid, 2 - diethylamino-ethyl ester, pyrrolidine, piperidine, morpholine, 1-ethyl-piperidine or 2-piperdino-ethanol, and the like. A particular advantage of the salts is that they tend to stabilize the acids falling under Formulas I(A) and I(B).

The compounds of the present invention can be prepared in a number of ways as is more fully described in pending application Ser. No. 861,571, the disclosure of which is hereby incorporated by reference. The following are typical compounds thus prepared:

Representative of the free acids utilized in the methods and compositions of the present invention are the following:

(a) 2-(2,6-dichloroanilino)phenylacetic acid,
(b) 2-(2-chloro-6-methylanilino)phenylacetic acid,
(c) 2-(2,6-dichloroanilino)-5-chlorophenylacetic acid,
(d) 2-(2,6-dichloro-3-methylanilino)-5-chlorophenylacetic acid,
(e) 2-(2,6-dichloro-3-methylanilino)-5-methoxyphenylacetic acid,
(f) 2-(2,6-dichloroanilino)-5-methoxyphenylacetic acid,
(g) 2-(2,6-dichloroanilino)-5-bromophenylacetic acid,
(h) 2-(2,6-dichloro-3-methylanilino)phenylacetic acid,
(i) 2-(3-trifluoromethylanilino)phenylacetic acid,
(j) 2-(2-methoxy-5-methylanilino)phenylacetic acid,
(k) 2-(2-chloro-5-trifluoromethylanilino)phenylacetic acid,
(l) 2-(2,3-dimethylanilino)phenylacetic acid,
(m) 2-(2-methyl-3-chloroanilino)phenylacetic acid,
(n) 2-[2-(2,6-dichloro-3-methylanilino)phenyl]propionic acid,
(o) 2-[2-(2,6-dichloroanilino)phenyl]propionic acid,
(p) 2-[2-(2,6-dichloroanilino)-5-chlorophenyl]propionic acid,
(q) 2-[2-(2,6-dichloroanilino)phenyl]butyric acid,
(r) 2-[2-(2,6-dichloroanilino)phenyl]-3-phenylpropionic acid,
(s) 2-[2-(2,6-dichloroanilino)phenyl]-2-methylpropionic acid, (t) 2-(2,6-dimethylanilino)phenylacetic acid,
(u) 2-(2,6-dimethylanilino)-5-methylphenylacetic acid,
(v) 2-[3,5-bis(trifluoromethyl)anilino]phenylacetic acid.

Representative of the salts of the foregoing free acids utilized in the methods and compositions of the present invention are the following:

(a) The sodium salt of 2-(2,6-dichloroanilino)-phenylacetic acid.
(b) The sodium salt of 2-(2,6-dichloroanilino)-5-chlorophenylacetic acid,
(c) The sodium salt of 2-(2,6-dichloro-3-methylanilino)phenylacetic acid,
(d) The sodium salt of 2-[2-(2,6-dichloroanilino)-5-chlorophenyl]propionic acid,
(e) The sodium salt of 2-(2-chloro-5-trifluoromethylanilino)-phenylacetic acid,
(f) The potassium salt of 2-(2,6-dichloroanilino)phenylacetic acid,
(g) The sodium salt of 2-(2,6-dimethylanilino)-5-methylphenylacetic acid,
(h) The sodium salt of 2-(2,6-dimethylanilino)phenylacetic acid,
(i) The sodium salt of 2-[3,5-bis(trifluoromethyl)anilinophenyl]acetic acid.

Representative of the esters of the above free acids utilized in the methods and compositions of the present invention are the following:

(a) methyl 2-(2,6-dichloroanilino)phenylacetate,
(b) methyl 2-(2,6-dichloroanilino)-5-chlorophenylacetate,
(c) methyl 2-(2,6-dichloro-3-methylanilino)-5-methoxyphenylacetate,
(d) methyl 2-(3-trifluoromethylanilino)phenylacetate,
(e) methyl 2-(2-methoxy-5-methylanilino)phenylacetate
(f) methyl 2-(2-chloro-5-trifluoromethylanilino)phenylacetate,
(g) methyl 2-[2-(2,6-dichloroanilino)phenyl]propionate,
(h) methyl 2-[2-(2,6-dichloro-3-methylanilino)phenyl]propionate,
(i) methyl 2-[2-(2,6-dichloroanilino)phenyl]butyrate,
(j) methyl 2-(2-methyl-3-chloroanilino)phenylacetate,
(k) methyl 2-(2,3-dimethylanilino)phenylacetate,
(l) methyl 2-(2,6-dichloro-3-methylanilino)phenylacetate,
(m) ethyl 2-(2,6-dichloroanilino)phenylacetate,
(n) benzyl 2-(2,6-dichloroanilino)phenylacetate,
(o) methyl 2-(2-chloro-6-methylanilino)phenylacetate The following examples set forth the manner and process of making typical embodiments of the invention, without being a limitation thereof, and include the best mode contemplated by the inventors for carrying out the invention.

Example 1

One kilogram of 2-(2,6-dichloro-3-methylanilino)phenylacetic acid are mixed with 550.0 g. of lactose and 292.0 g. of potato starch, the mixture is moistened with an alcoholic solution of 8.0 g. of gelatin and granulated through a sieve. After drying 60.0 g. of potato starch, 60.0 g. of talcum, 10.0 g. of magnesium stearate and 20.0 g. of colloidal silicium dioxide are mixed in and the mixture is pressed into 10,000 tablets, each weighing 200 mg. and containing 100 mg. of active substance. The tablets can be grooved for better adaption of the dosage.

Example 2

Two hundred grams of 2-(2,6-dichloro-3-methylanilino)-phenylacetic acid are well mixed with 16 g. of maize starch and 6.0 g. of colloidal silicium dioxide. The mixture is moistened with a solution of 2.0 g. of stearic acid, 6.0 g. of ethyl cellulose and 6.0 g. of stearin in about 70 ml. of isopropyl alcohol and granulated through a sieve III (Ph. Helv. V). The granulate is dried for about 14 hours and then passed through sieve III–IIIa. It is then mixed with 16.0 g. of maize starch, 16.0 g. of talcum and 2.0 g. of magnesium stearate and pressed into 1000 dragee cores. These are coated with a concentrated syrup from 2.000 g. of shellac, 7.500 g. of gum arabic, 0.150 g. of dyestuff, 2.000 g. of highly dispersed silicium dioxide, 25.000 g. of talcum and 53.350 g. of sugar and dried. The dragees obtained each weigh 360 mg. and contain 200 mg. of active substance.

Example 3

One kilogram of methyl-2-(2,6-dichloro-3-methylanilino)phenylacetate are mixed with 550.0 g. of lactose and 292.0 g. of potato starch. The mixture is moistened with an alcoholic solution of 8.0 g. of gelatin and granulated through a sieve. After drying, 60.0 g. of potato starch, 60.0 g. of talcum, 10.0 g. of magnesium stearate and 20.0 g. of colloidal silicon dioxide are mixed in, and the mixture is pressed into 10,000 tablets, each weighing 200 mg. and containing 100 mg. of active substance. If desired, the tablets can be grooved for better adaption of the dosage.

Example 4

Two hundred grams of methyl-2-(2,6-dichloro-3-methylanilino)phenylacetate, 16 g. of maize starch and 6.0 g. of colloidal silicon dioxide are well mixed. The mixture is moistened with a solution of 2.0 g. of stearic acid, 6.0 g. of ethyl cellulose and 6.0 g. of stearin in about 70 ml. of isopropyl alcohol and granulated through a sieve. The granulate is dried for about 14 hours and then passed through another sieve. It is then mixed with 16.0 g. of maize starch, 16.0 g. of talcum and 2.0 g. of magnesium stearate and pressed into 1000 dragee cores. These are coated with a concentrated syrup made from 2.000 g. of shellac, 7.500 g. of gum arabic, 0.150 g. of dyestuff, 2.000 g. of highly dispersed silicon dioxide, 25.000 g. of talcum and 53.350 g. of sugar and dried. The dragees obtained each weigh 360 mg. and contain 200 mg. of active substance.

Dosage units for rectal administration are, for example, suppositories which consist of a combination of a compound of Formula I or a suitable salt thereof with a neutral fatty foundation, or gelatin rectal capsules which contain a combination of an active substance or a suitable salt thereof with polyethylene glycols (Carbowaxes) of suitable molecular weight.

Ampoules for parenteral, particularly intramuscular, administration preferably contain a water soluble salt, e.g., the sodium salt, of a substituted phenylacetic acid falling under Formula I, in a concentration of, preferably, 0.5 to 5%, in aqueous solution, optionally together with suitable stabilizing agents and buffer substances.

The following prescriptions can be used for the production of sun-tan creams:

Example 5

| | G. |
|---|---|
| 2-(2,6-dichloroanilino)phenylacetic acid | 1.0 |
| Paraffin oil, thinly liquid | 1.0 |
| Polyoxyethylene sorbitan monostearate | 2.0 |
| Polyoxyethylene sorbitol lanoline derivative | 1.5 |
| Sorbitol solution 70% | 3.0 |
| Stearic acid | 15.0 |
| Preservative and perfume q.s. | |
| Water ad 100.0 g. | |

Example 6

| | G. |
|---|---|
| 2-(2,6-dichloroanilino)phenylacetic acid | 1.0 |
| Propylene glycol | 28.0 |
| Glycerine monostearate | 18.0 |
| Polyoxyethylene-sorbitan monolaurate | 8.0 |
| Thimersol (solution 1:1000) | 1.0 |
| Perfume q.s. | |
| Water ad 100.0 g. | |

Example 7

| | G. |
|---|---|
| Methyl-2-(2,6-dichloroanilino)phenylacetate | 1.0 |
| Paraffin oil (thin liquid) | 1.0 |
| Polyoxyethylene-sorbitan monostearate | 2.0 |
| Polyoxyethylene-sorbitol-lanolin derivative | 1.5 |
| Sorbitol solution 70% | 3.0 |
| Stearic acid | 15.0 |
| Preservative and perfume q.s. | |
| Water ad 100.0 g. | |

Example 8

| | G. |
|---|---|
| Ethyl 2-(2,6-chloroanilino)phenylacetate | 1.0 |
| Propylene glycol | 28.0 |
| Glycerine monostearate | 18.0 |
| Polyoxyethylene-sorbitan monolaurate | 8.0 |
| Thimerosal (solution 1:1000) | 1.0 |
| Perfume q.s. | |
| Water ad 100.0 g. | |

Example 9

Twenty grams 2-[3,5 - bis(trifluoromethyl)anilino] phenylacetic acid are dissolved in a mixture of 232 ml. of 1 N sodium hydroxide solution and 500 ml. of boiled water free of pyrogen and the solution is made up to 2000 ml. with more of the same water. The solution is filtered, filled into 1000 ampoules of 2 ml. and sterilized. Each 2 ml. ampoule contains 20 mg. of 2-[3,5-bis(trifluoromethyl)anilino]phenylacetic acid as active ingredient in the form of the sodium salt.

What is claimed is:

1. The method of treating inflammation in a mammal which comprises administering thereto an anti-inflammatory effective amount of a compound of the formula:

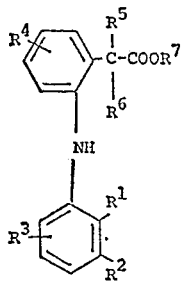

wherein
$R^1$ is (lower)alkyl, (lower)alkoxy, fluoro or chloro;
each of $R^2$ and $R^3$ is hydrogen, (lower)alkyl, chloro or fluoro;
$R^4$ is hydrogen, (lower)alkyl, (lower)alkoxy, chloro, fluoro or bromo;
$R^5$ is hydrogen or (lower)alkyl;
$R^6$ is hydrogen, (lower)alkyl or when $R^5$ is hydrogen, benzyl; and
$R^7$ is hydrogen, (lower)alkyl or benzyl, or
a pharmaceutically acceptable salt thereof when $R^7$ is hydrogen.

2. The method according to claim 1 where in said compound
$R^1$ is lower alkyl or chloro;
$R^2$ is hydrogen, (lower)alkyl or chloro;
$R^3$ is hydrogen, chloro or (lower)alkyl in the 6'-position;
$R^4$ is hydrogen or chloro; and
each of $R^5$, $R^6$ and $R^7$ is hydrogen.

3. The method according to claim 1 where in said compound
$R^1$ is methyl;
$R^3$ is chloro in the 6'-position; and
each of $R^2$, $R^3$, $R^4$, $R^5$, $R^6$ and $R^7$ is hydrogen.

4. The method according to claim 1 where in said compound
$R^1$ is chloro;
$R^2$ is methyl;
$R^3$ is chloro in 6'-position; and
each of $R^4$, $R^5$, $R^6$ and $R^7$ is hydrogen, or the sodium salt thereof.

5. The method according to claim 1 where in said compound
$R^1$ is chloro;
$R^3$ is chloro in 6'-position;
$R^4$ is chloro in 5-position; and
each of $R^2$, $R^5$, $R^6$ and $R^7$ is hydrogen; or the sodium salt thereof.

6. The method according to claim 1 where in said compound
$R^1$ is methyl;
$R^3$ is methyl in 6'-position; and
each of $R^2$, $R^4$, $R^5$, $R^6$ and $R^7$ is hydrogen; or the sodium salt thereof.

7. The method according to claim 1 where in said compound
$R^1$ is methyl;
$R^2$ is methyl; and
each of $R^3$, $R^4$, $R^5$, $R^6$ and $R^7$ is hydrogen.

8. The method according to claim 1 where in said compound
$R^1$ is chloro;
$R^3$ is chloro in 6'-position; and
each of $R^2$, $R^4$, $R^5$, $R^6$ and $R^7$ is hydrogen; or the sodium salt thereof.

9. The method according to claim 1 where in said compound
$R^1$ is methyl;
$R^2$ is chloro; and
each of $R^3$, $R^4$, $R^5$, $R^6$ and $R^7$ is hydrogen.

10. The method according to claim 1 where in said compound $R^7$ is (lower)alkyl or benzyl.

11. The method according to claim 1 where in said compound
$R^1$ is (lower)alkyl or chloro;
$R^2$ is hydrogen or (lower)alkyl;
$R^3$ is hydrogen, (lower)alkyl or chloro in 6'-position;
$R^4$ is hydrogen or chloro;
each of $R^5$ and $R^6$ is hydrogen; and
$R^7$ is (lower)alkyl.

12. The method according to claim 1 where in said compound
$R^1$ is methyl;
$R^3$ is chloro in 6'-position;
$R^7$ is methyl; and
each of $R^2$, $R^4$, $R^5$ and $R^6$ is hydrogen.

13. The method according to claim 1 where in said compound
$R^1$ is phloro;
$R^3$ is chloro in 6'-position;
$R^7$ is methyl; and
each of $R^2$, $R^4$, $R^5$ and $R^6$ is hydrogen.

14. The method according to claim 1 where in said compound
$R^1$ is chloro;
$R^2$ is methyl;
$R^3$ is chloro in 6'-position;
$R^7$ is methyl; and
each of $R^4$, $R^5$ and $R^6$ is hydrogen.

15. The method according to claim 1 where in said compound
$R^1$ is chloro;
$R^3$ is chloro in 6'-position;
$R^7$ is ethyl; and
each of $R^2$, $R^4$, $R^5$ and $R^6$ is hydrogen.

16. The method according to claim 1 where in said compound
$R^1$ is methyl;
$R^2$ is methyl;
$R^7$ is methyl; and
each of $R^3$, $R^4$, $R^5$ and $R^6$ is hydrogen.

17. The method according to claim 1 where in said compound
$R^1$ is methyl;

$R^2$ is chloro;
$R^7$ is methyl; and
each of $R^3$, $R^4$, $R^5$ and $R^6$ is hydrogen.

18. The method of protecting against irritating rays of ultra-violet light which comprises applying to the skin of a mammal a compound as defined in claim 1, in an amount sufficient to absorb irritating ultra-violet rays.

19. The method of treating inflammation in a mammal which comprises administering thereto an anti-inflammatory effective amount of a compound of the formula:

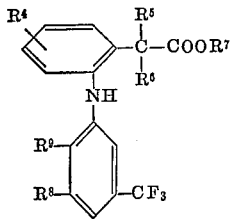

wherein
$R^4$ is hydrogen, (lower)alkyl, (lower)alkoxy, chloro, fluoro or bromo;
$R^5$ is hydrogen or (lower)alkyl;
$R^6$ is hydrogen, (lower)alkyl or when $R^5$ is hydrogen, benzyl;
$R^7$ is hydrogen, (lower)alkyl or benzyl;
$R^8$ is hydrogen or trifluoromethyl; and
$R^9$ is hydrogen or chloro, or
a pharmaceutically acceptable salt thereof when $R^7$ is hydrogen.

20. The method according to claim 19 where in said compound each of $R^4$, $R^5$, $R^6$, $R^7$, $R^8$ and $R^9$ is hydrogen, or the sodium salt thereof.

21. The method according to claim 19 where in said compound each of $R^4$, $R^5$, $R^6$, $R^7$ and $R^8$ is hydrogen and $R^9$ is chloro, or the sodium salt thereof.

22. The method according to claim 19 where in said compound each of $R^4$, $R^5$, $R^6$, $R^7$ and $R^9$ is hydrogen and $R^8$ is trifluoromethyl, or the sodium salt thereof.

23. The method according to claim 19 where in said compound each of $R^4$, $R^5$, $R^6$, $R^8$ and $R^9$ is hydrogen and $R^7$ is methyl, or the sodium salt thereof.

24. The method according to claim 19 where in said compound each of $R^4$, $R^5$, $R^6$ and $R^8$ is hydrogen, $R^7$ is methyl and $R^9$ is chloro.

25. The method of protecting against irritating rays of ultra-violet light which comprises applying to the skin of a mammal a compound as defined in claim 19 in an amount sufficient to absorb irritating ultra-violet rays.

26. A pharmaceutical composition comprising (a) an anti-inflammatory effective amount of a compound of the formula:

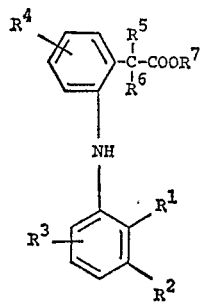

wherein
$R^1$ is (lower)alkyl, lower)alkoxy, fluoro or chloro; each of $R^2$ and $R^3$ is hydrogen, (lower)alkyl, chloro, or fluoro;
$R^4$ is hydrogen, (lower)alkyl, (lower)alkoxy, chloro, fluoro or bromo;
$R^5$ is hydrogen or (lower)alkyl;

$R^6$ is hydrogen, (lower)alkyl or when $R^5$ is hydrogen, benzyl; and
$R^7$ is hydrogen, (lower)alkyl or benzyl, or
a pharmaceutically acceptable salt thereof when $R^7$ is hydrogen, and (b) a pharmaceutically acceptable carrier.

27. A pharmaceutical composition according to claim 26 where in said compound
$R^1$ is (lower)alkyl or chloro;
$R^2$ is hydrogen, (lower)alkyl or chloro;
$R^3$ is hydrogen, chloro or (lower)alkyl in the 6'-position;
$R^4$ is hydrogen or chloro; and
each of $R^5$, $R^6$ and $R^7$ is hydrogen.

28. A pharmaceutical composition according to claim 26 where in said compound
$R^1$ is methyl;
$R^3$ is chloro in the 6'-position; and
each of $R^2$, $R^3$, $R^4$, $R^5$, $R^6$ and $R^7$ is hydrogen.

29. A pharmaceutical composition according to claim 26 where in said compound
$R^1$ is chloro;
$R^2$ is methyl;
$R^3$ is chloro in 6'-position; and
each of $R^4$, $R^5$, $R^6$ and $R^7$ is hydrogen, or the sodium salt thereof.

30. A pharmaceutical composition according to claim 26 where in said compound
$R^1$ is chloro;
$R^3$ is chloro in 6'-position;
$R^4$ is chloro in 5-position; and
each of $R^2$, $R^5$, $R^6$ and $R^7$ is hydrogen; or the sodium salt thereof.

31. A pharmaceutical composition according to claim 26 where in said compound
$R^1$ is methyl;
$R^3$ is methyl in 6'-position; and
each of $R^2$, $R^4$, $R^5$, $R^6$ and $R^7$ is hydrogen; or the sodium salt thereof.

32. A pharmaceutical composition according to claim 26 where in said compound
$R^1$ is methyl;
$R^2$ is methyl; and
each of $R^3$, $R^4$, $R^5$, $R^6$ and $R^7$ is hydrogen.

33. A pharmaceutical composition according to claim 26 where in said compound
$R^1$ is chloro;
$R^3$ is chloro in 6'-position; and
each of $R^2$, $R^4$, $R^5$, $R^6$ and $R^7$ is hydrogen; or the sodium salt thereof.

34. A pharmaceutical composition according to claim 26 where in said compound
$R^1$ is methyl;
$R^2$ is chloro; and
each of $R^3$, $R^4$, $R^5$, $R^6$ and $R^7$ is hydrogen.

35. A pharmaceutical composition according to claim 26 where in said compound
$R^1$ is methyl;
$R^3$ is chloro in 6'-position;
$R^7$ is methyl; and
each of $R^2$, $R^4$, $R^5$ and $R^6$ is hydrogen.

36. A pharmaceutical composition according to claim 26 where in said compound
$R^1$ is chloro;
$R^3$ is chloro in 6'-position;
$R^7$ is methyl, and
each of $R^2$, $R^4$, $R^5$ and $R^6$ is hydrogen.

37. A pharmaceutical composition according to claim 26 where in said compound
$R^1$ is chloro;
$R^2$ is methyl;
$R^3$ is chloro in 6'-position,
$R^7$ is methyl, and
each of $R^4$, $R^5$ and $R^6$ is hydrogen.

38. A pharmaceutical composition according to claim 26 where in said compound
$R^1$ is chloro;

$R^3$ is chloro in 6'-position;
$R^7$ is ethyl; and
each of $R^2$, $R^4$, $R^5$ and $R^6$ is hydrogen.

39. A pharmaceutical composition according to claim 26 where in said compound
$R^1$ is methyl;
$R^2$ is methyl;
$R^7$ is methyl; and
each of $R^3$, $R^4$, $R^5$ and $R^6$ is hydrogen.

40. A pharmaceutical composition according to claim 26 where in said compound
$R^1$ is methyl;
$R^2$ is chloro;
$R^7$ is methyl; and
each of $R^3$, $R^4$, $R^5$ and $R^6$ is hydrogen.

41. A pharmaceutical composition comprising (a) an anti'-inflammatory effective amount of a compound of the formula:

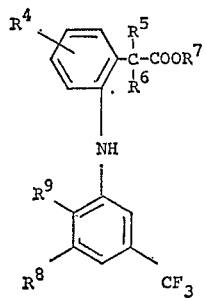

wherein
$R^4$ is hydrogen, (lower)alkyl, (lower)alkoxy, chloro, fluoro or bromo;
$R^5$ is hydrogen or (lower)alkyl;
$R^6$ is hydrogen, (lower)alkyl or when $R^5$ is hydrogen, benzyl;
$R^7$ is hydrogen, (lower)alkyl or benzyl;
$R^8$ is hydrogen or trifluoromethyl; and
$R^9$ is hydrogen or chloro, or
a pharmaceutically acceptable salt thereof when $R^7$ is hydrogen and (b) a pharmaceutical carrier.

42. A pharmaceutical composition according to claim 41 where in said compound each of $R^4$, $R^5$, $R^6$, $R^7$, $R^8$ and $R^9$ is hydrogen, or the sodium salt thereof.

43. A pharmaceutical composition according to claim 41 where in said compound each of $R^4$, $R^5$, $R^6$, $R^7$ and $R^8$ is hydrogen and $R^9$ is chloro, or the sodium salt thereof.

44. A pharmaceutical composition according to claim 41 where in said compound each of $R^4$, $R^5$, $R^6$, $R^7$ and $R^9$ is hydrogen and $R^8$ is trifluoromethyl, or the sodium salt thereof.

45. A pharmaceutical composition according to claim 41 where in said compound each of $R^4$, $R^5$, $R^6$ and $R^9$ $R^9$ is hydrogen and $R^7$ is methyl, or the sodium salt thereof.

46. A pharmaceutical composition according to claim 41 where in said compound each of $R^4$, $R^5$, $R^6$ and $R^8$ is hydrogen, $R^7$ is methyl and $R^9$ is chloro.

References Cited
UNITED STATES PATENTS
3,413,313  11/1968  Scherrer _____ 260—47

STANLEY J. FRIEDMAN, Primary Examiner

U.S. Cl. X.R.
424—309, 317; 260—471, 501.1, 501.11, 501.17, 518, 519

PO-1050
(5/69)

CASE 2163/CIP II/DIV

UNITED STATES PATENT OFFICE
CERTIFICATE OF CORRECTION

Patent No. 3,652,762      Dated March 28, 1972

Inventor(s) ALFRED SALLMANN ET AL

It is certified that error appears in the above-identified patent and that said Letters Patent are hereby corrected as shown below:

Column 12, Claim 45, line 19, delete "$R^7$" and insert --- $R^8$ ---; line 20, delete "$R^9$".

Signed and sealed this 30th day of January 1973.

(SEAL)
Attest:

EDWARD M. FLETCHER, JR.
Attesting Officer

ROBERT GOTTSCHALK
Commissioner of Patents bc

Disclaimer 3,652,762.—*Alfred Sallmann*, Bottmingen, and *Rudolf Pfister*, Basel, Switzerland. PHARMACEUTICAL COMPOSITIONS AND METHODS EMPLOYING SUBSTITUTED DERIVATIVES OF 2-ANILINOPHENYLACETIC ACIDS AND ESTERS. Patent dated Mar. 28, 1972. Disclaimer filed Oct. 22, 1984, by the assignee, *Ciba-Geigy Corp.*

Hereby enters this disclaimer to claims 5-7, 9-12, 16-19, 22-23, 25-28, 30-32, 34-35, 39-41 and 44-45 of said patent.

[*Official Gazette December 18, 1984.*]

UNITED STATES PATENT AND TRADEMARK OFFICE

CERTIFICATE EXTENDING PATENT TERM
UNDER 35 U.S.C. 156

Patent No.    : 3,652,762

Dated         : March 28, 1972

Inventor(s)   : Alfred Sallmann, et al

Patent Owner  : Ciba-Geigy Corporation

This is to certify that there has been presented to the

COMMISSIONER OF PATENTS AND TRADEMARKS an application under 35 U.S.C. 156 for an extension of the patent term. Since it appears that the requirements of the law have been met, this certificate extends the term of the patent for the period of

2 YEARS with all rights pertaining thereto as provided by 35 USC 156 (b).

I have caused the seal of the Patent and Trademark Office to be affixed this 18th day of September 1989.

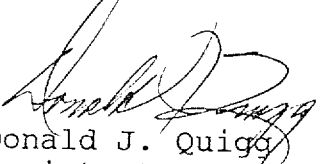

Donald J. Quigg
Assistant Secretary and Commissioner of Patents and Trademarks